Patented Mar. 12, 1935

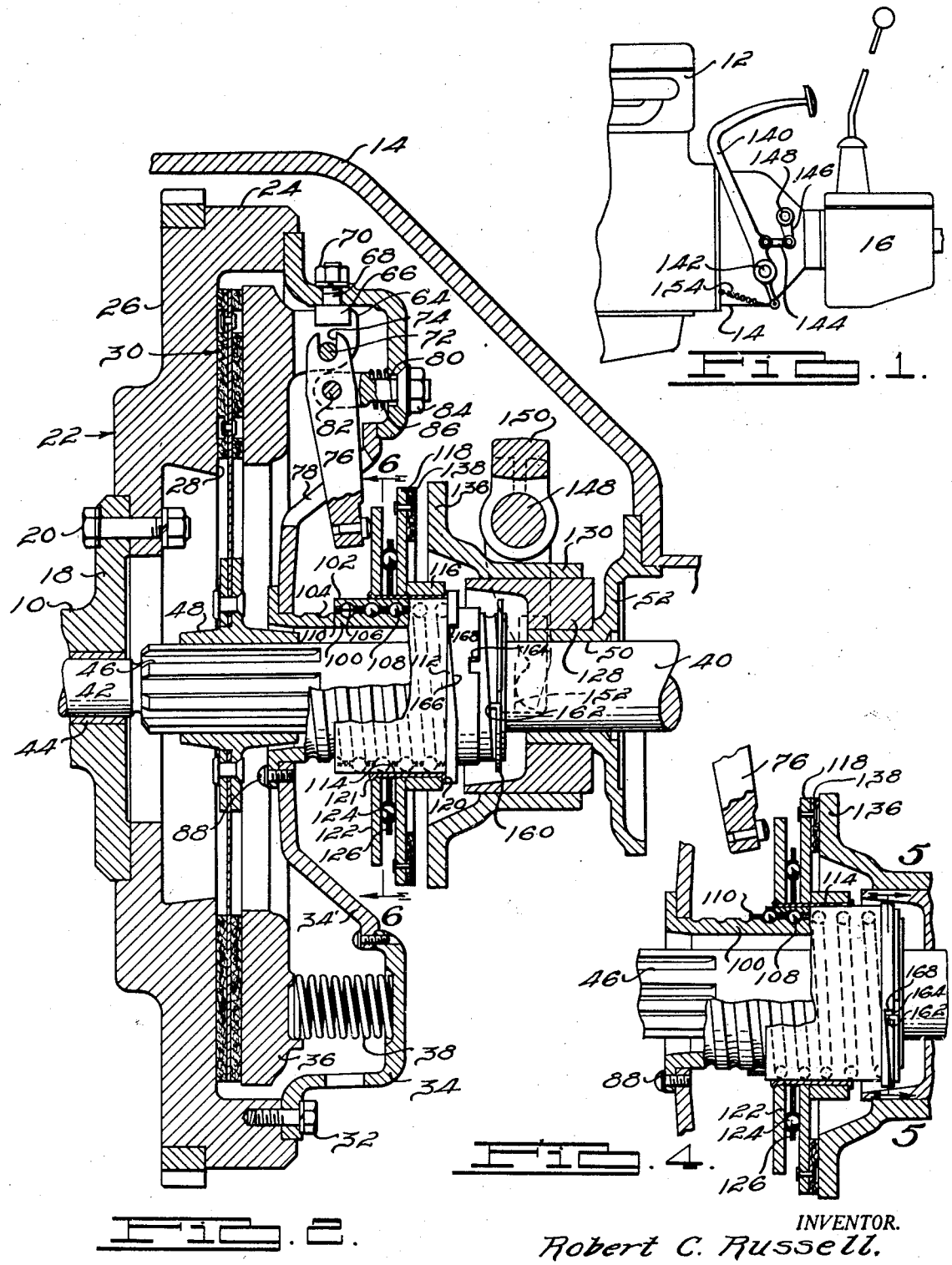

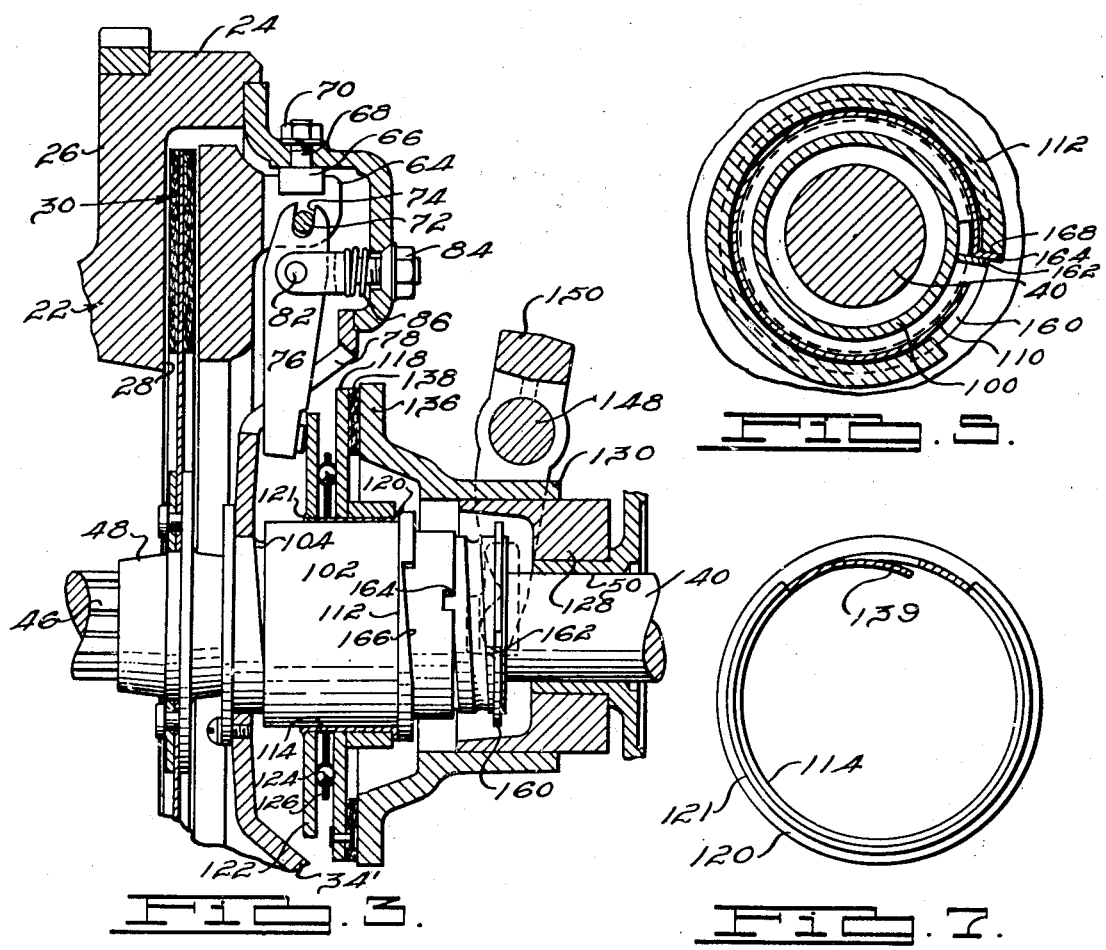
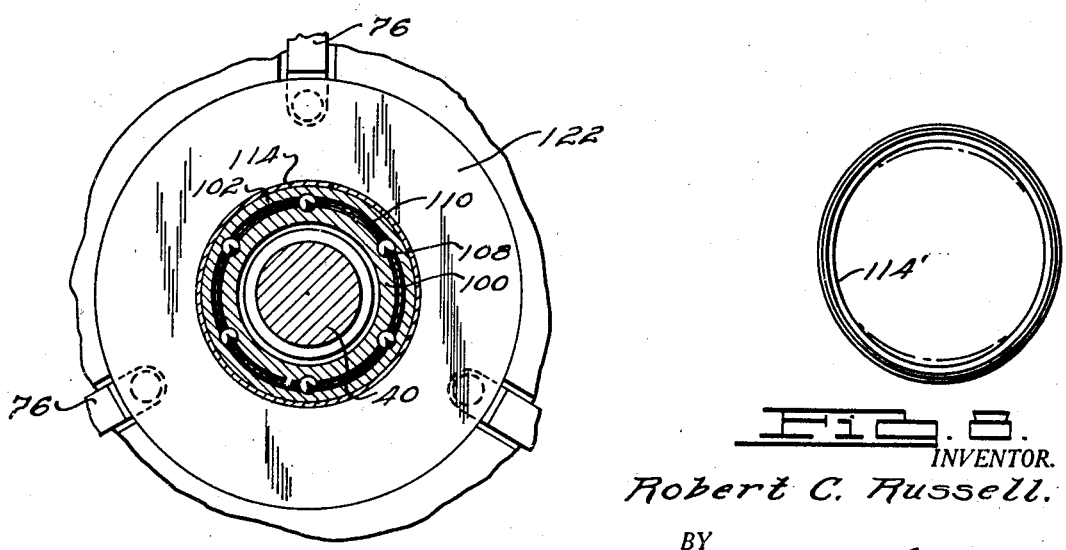

1,993,980

UNITED STATES PATENT OFFICE 1,993,980

SERVOMECHANISM

Robert C. Russell, Detroit, Mich.

Application December 30, 1933, Serial No. 704,717

11 Claims. (Cl. 192—36)

This invention relates to servomechanism and particularly to such mechanism as is applicable for use in connection with motor vehicles for enabling operating parts thereof such, for instance, as the clutch, brake or other devices, to be actuated with a minimum amount of physical effort on the part of the operator, both as to the operating pressures and required amount of travel of the pedal or other operating device, and the results obtained thereby are similar in effect to the results obtained by the structure disclosed in my co-pending application for Letters Patent of the United States on Servomechanism filed December 1, 1933, Serial No. 700,423.

Objects of the invention are to provide a servomechanism particularly designed to resist the shock of abnormal return movement of the various parts thereof toward normal inoperative position; to provide a servomechanism that will not jamb in operation; and to provide a servomechanism in which the disadvantageous effect of inertia of the moving parts thereof under abnormal conditions of operation is reduced to a minimum.

Other objects of the invention are to provide a servomechanism including a movable unit including parts frictionally associated with each other whereby one part may move relative to another part thereby to reduce the effect of inertia forces built up in the unit as a whole; to provide a servomechanism including a unit the various parts of which are normally movable as a whole but in which certain parts of the unit are frictionally associated with other parts thereof so as to permit relative displacement between them; to provide a servomechanism including a part adapted for axial displacement upon relative rotation thereof with respect to another part and having a friction element frictionally associated therewith; to provide a servomechanism including a pair of relatively rotatable and axially movable parts so associated with each other that relative rotation between them will cause axial displacement of one with respect to the other, and a friction element axially movable and rotatable relative to one of said parts adapted for frictional engagement therewith; to provide a servomechanism including an axially movable and rotatable part and an associated friction element rotatable and axially slidable with respect thereto, the friction element adapted to be frictionally urged for equal rotation with the part upon movement of said servomechanism toward operative position; and to provide a servomechanism including a rotatable and axially movable member having associated therewith a relatively rotatable and axially movable friction element, together with means for limiting axial movement of the friction element in at least one direction relative to the member.

Other objects include the provision of new and novel stop means for limiting abnormal movement of relatively movable parts of a servomechanism; the provision of a servomechanism having a pair of parts having thread-like engagement with each other, together with a novel stop means for limiting relative movement of the parts in one direction and so arranged as to eliminate the necessity of overcoming the mechanical advantage of the thread-like engagement between the parts in overcoming the momentum of one part moving relative to the other; the provision of a stop means for a servomechanism including a pair of parts having thread-like engagement with each other including intersecting stop surfaces disposed in the path of thread-like movements between the parts; and the provision of a servomechanism including a pair of sleeve-like members having thread-like engagement with each other through the use of rolling anti-friction members, and a retainer for said rolling anti-friction members disposed between said sleeves, the two sleeves and the retainer member being provided with co-operating stop surfaces disposed in the path of thread-like movement between said sleeves.

Further objects are to provide a clutch, and an associated servomechanism of novel construction; to provide a novel combination of clutch and servomechanism; and to provide a clutch and associated servomechanism in which relative movement may occur between parts of the servomechanism without causing the servomechanism to function in a clutch operative sense.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Fig. 1 is a fragmentary side elevational view of a unitary power plant for a motor vehicle including a portion of the engine, the clutch and the transmission thereof.

Fig. 2 is an enlarged partially broken vertical sectional view taken axially through the clutch indicated in Fig. 1, showing the clutch in engaged position and as being provided with a servomechanism so constructed as to include a suitable embodiment of the present invention.

Fig. 3 is a fragment of a view similar to that in Fig. 2 but illustrating the position of the clutch and servomechanism when the clutch is in disengaged position.

Fig. 4 is a fragment of a view similar to that illustrated in Figs. 2 and 3 and illustrating the positions which parts of the servomechanism may assume under certain abnormal conditions of operation.

Fig. 5 is a transverse sectional view taken on the line 5—5 of Fig. 4, illustrating the manner in which the stop surfaces coact with one another in limiting abnormal movement of certain parts of the servomechanism.

Fig. 6 is a fragmentary transverse sectional view taken on the line 6—6 of Fig. 2.

Fig. 7 is a partially broken, partially sectioned end elevational view of the sleeve member employed between the outer sleeve or nut member of the servomechanism and the friction disc therefor.

Fig. 8 is an end elevational view of a modified form of the sleeve member shown in Fig. 7.

While the servomechanism forming the subject matter of the present invention is adaptable for use in connection with a relatively large number of devices, it is particularly adapted for use in connection with the clutch or brakes of a motor vehicle and, accordingly, as a means of illustrating one of its applications, it is shown in the accompanying drawings as adapted to operate the clutch of a motor vehicle. The particular mechanism herein shown and described is an improvement of the invention shown and described in my co-pending application for Letters Patent of the United States for improvement in Clutches, filed the 21st day of August, 1933, Serial Number 686,019 which has eventuated into Patent No. 1,967,563.

The main elements of the illustrative embodiment of the present invention herein shown are similar to the same elements shown and described in one modification of my co-pending application Ser. No. 686,019, above referred to, and while it is to be understood that the construction shown and described in said application operates in a satisfactory and acceptable manner, I have found that under certain abnormal conditions of operation difficulties may arise in the operation of the structure there disclosed, which difficulties are eliminated by the mechanism provided in accordance with the present invention. I have found that in the construction disclosed in the last mentioned previous application above referred to, where the servomechanism is applied to clutches of unusually high capacities, if the operator of the clutch allows his foot to slip off of the control pedal while the clutch is in fully disengaged position, the extremely high pressure of the clutch springs will act so suddenly and forcefully on the servomechanism as to return the outer member of the servomechanism towards normal inoperative position with such great speed that the shock of stopping this member subjects the mechanism to excessive strain, and in some cases is liable to cause it to become jambed. An equivalent condition may occur when the servomechanism is applied to operate in any other device actuated in one direction by spring or other pressure. While such occurrences are comparatively rare and may not cause any damage in any case, there is a possibility that such damage may arise and, accordingly, by the practice of the present invention any possibility thereof is eliminated entirely.

Referring now to the accompanying drawings, there is illustrated in Fig. 1 a fragment of the usual type of unitary power plant provided for motor vehicles and which includes an engine 12 having secured to its rear end a clutch housing 14 enclosing a suitable clutch mechanism, and in turn to the rear end of which is supported the usual transmission or change speed gearing unit 16.

The particular type of clutch employed within the casing 14 to transmit power from the engine 12 to the transmission unit 16 is immaterial as far as the present invention is concerned, the particular clutch shown by way of illustration being of a conventional spring packed single dry disc type of the following construction.

Referring now particularly to Fig. 2, it will be noted that the rear end of the crankshaft 10 for the engine 12 is provided with a radial flange 18 upon which is mounted and to which is secured by means of bolts 20, the usual engine fly wheel 22, the rim 24 of which projects rearwardly beyond the web 26 thereof. The rear face of the flywheel web 26 is formed to provide a smooth annular radially extending face 28 against which the clutch driven disc, indicated generally at 30, is adapted to be clamped when the clutch is in engaged position.

To the rear face of the rim 24 of the flywheel 22 is secured by screws 32 a clutch cover 34, and positioned between the cover 34 and the driven disc 30, is the usual pressure plate 36 which is constantly urged toward a position to clamp the pressure plate 30 against the face 28 by means of a plurality of coil springs 38 maintained under compression between the cover 34 and the pressure plate 36.

The clutch shaft 40 which is provided in axial extension of the engine crankshaft 10, is provided with a reduced forward end 42 which is suitably guided and has bearing in the bearing bushing 44 provided in the rear end of the crankshaft 10. Immediately rearwardly of the reduced end 42, the outer surface of the shaft 40 is splined as at 46 for slidable but relatively non-rotatable engagement with the hub 48 of the clutch driven disc 30. The rear end of the shaft 40 is suitably guided and has bearing in the collar 50 formed on a member 52 suitably fixed to the rear end of the clutch housing 14.

The pressure plate 36 is provided with a plurality of equally angularly spaced rearwardly extending pairs of circumferentially spaced lugs 64 on its rear face adjacent its outer edge, and embraced between the radially outer edges of each pair of the lugs 64, is a guiding member 66 guiding the corresponding lugs 64 for sliding movement with the pressure plate 36 axially of the shaft 40, but maintaining the pressure plate against relative rotation with respect to the flywheel 22. Each of the guiding members 66 is provided with an integral stud 68, which projects radially outwardly therefrom through the clutch cover 34 and on the outer side thereof is provided with a nut 70 to lock it in place. Inwardly of the members 66, each of the pairs of lugs 64 is provided with a pin 72 projecting transversely therethrough which is received in a co-operating slot 74 formed in the outer ends of corresponding clutch throw out arms or fingers 76 which extend in a generally radially inward direction therefrom through openings 78 in the clutch cover 34. Each of the fingers 76 is pivotally supported from the clutch cover 34 by means of a post member 80 projecting forwardly through the rear face of the clutch cover 34 and having its forward end embracing the opposite sides of the corresponding finger 76 and pivotally secured thereto by means of a pin 82. The axial position of each of the post members 80 is controlled by a nut 84 threaded thereonto and engaging the rear face of the clutch cover 34, and a coil spring 86 maintained under compression between the forward face of the clutch cover 34 and a suitable shoulder formed on the post member 80.

As will be obvious to those skilled in the art, if the radially inner ends of the clutch fingers 76 are urged forwardly under a sufficient pressure, the fingers 76 will be caused to pivot about their pivot pins 82 and their outer ends in moving rearwardly will draw the pressure plate 36 therewith against the force of the springs 38, and thereupon will free the clutch driven disc 30 from clamping relation with respect to the flywheel 22. This relation of parts is indicated in Fig. 3. The mechanism thus far described is conventional and forms no part of the present invention and is indicative only of one form of the clutch mechanism to which the present invention may be satisfactorily applied.

The clutch cover 34 in the present instance is shown as being provided with an inward extension 34' which extends in a generally radially inward direction to a point adjacent the outer surface of the rear end of the hub 48 where it has fixed thereto, as by screws 88, a rearwardly extending sleeve or sleeve-like member 100 concentric with the shaft 40. Surrounding the sleeve-like member 100 in concentric and slightly spaced relation with respect thereto, is a second sleeve-like member 102. The opposed faces of the members 100 and 102 are provided with opposed thread-like grooves or races 104 and 106 respectively of semi-circular section and between which a plurality of ball bearings 108 are received which not only serve to maintain these members 100 and 102 in concentric relation with respect to each other, but also to lock them together for threaded relation with respect to each other.

A relatively thin tubular sleeve 110 received between the opposed faces of the members 100 and 102, is provided with suitable apertures therein for reception of the balls 108 thereby to maintain them in equally angularly spaced relation as best illustrated in Fig. 6. This arrangement of parts, as will be observed, provides a structure wherein relative rotation between the members 100 and 102 will effect relative axial displacement of one with respect to the other.

It will be observed that the rear or right hand end of the sleeve or nut member 102 is provided with a radially extending peripheral flange 112, and that surrounding the member 102 forwardly of the flange 112 is a sleeve member 114 formed from relatively thin metal and upon which is mounted a spacer member 116, a disc 118 and a thrust bearing plate 122. As will hereinafter be apparent, the spacer member 116 may be rotatable relative to both the sleeve 114 and the disc 118, or may be fixed to either one of these parts if the disc 118 is frictionally associated with the sleeve 114. Preferably the disc 118 is fixed to the sleeve 114 in any desired manner for equal rotation therewith. Outwardly turned peripheral flanges 120 and 121 at opposite ends of the member 114 lock the members 116, 118 and 122 in their relative axial positions with respect to the member 114 and these flanges may be employed, if desired, to exert a sufficient clamping effect on the assembly to frictionally urge the disc 118 for equal rotation with the sleeve 114 where such frictional engagement is desired instead of the fixed relation preferred as described above. Ball bearings 124 are disposed between the thrust plate 122 and the disc 118 and are maintained in equally angularly spaced relation and against radial displacement from their intended location by means of a retainer disc 126 rotatably surrounding the member 114 between the disc 118 and plate 122. The retainer 126 is provided with apertures for receiving the ball bearings 124 therein so as to maintain the balls in their respective positions. As indicated in Figs. 2, 3 and 4, the disc or plate 122 is positioned for engagement with the inner ends of the clutch fingers 76 so that when the plate 122 is moved forward or to the left as viewed in the drawings, along the shaft 40, the inner ends of the fingers 76 will be moved forwardly therewith and will cause the pressure plate 36 to be withdrawn from clamping engagement with the clutch driven disc 30, as indicated in Fig. 3, and thereby place the clutch in disengaged position.

Fixed upon the sleeve 50, supporting the rear end of the shaft 40, is a member 128 having a cylindrical outer surface. A sleeve member 130 is axially slidably mounted upon the exterior surface of the member 128 and suitably maintained against rotation thereon by means not shown. The forward end of the sleeve 130 is formed to provide a radially extending annular flange or plate 136 which, upon forward movement of the sleeve 130, is adapted for inter-engagement with the disc 118. A ring 138 of friction material is preferably provided either upon the disc 118 or plate 136 to enhance the frictional characteristics of the engagement of these members, this ring 138 in the present case being shown as attached to the disc 118.

The sleeve member 114 surrounding the sleeve or nut member 102, and upon which the disc member 118 is rotatably mounted is formed for frictional engagement with the sleeve member 102. It is only necessary that this engagement be relatively light and accordingly means such as indicated in Fig. 7 may be provided for this purpose. As indicated in Fig. 7, a tongue 139 is struck out from the body of the sleeve member 114 and is bent inwardly beyond the inner surface of the member so as to form, in effect, a spring finger which will frictionally engage the outer surface of the sleeve member or nut 102. The amount of friction offered by engagement between the finger 139 and sleeve or nut member 102 will be sufficient to normally cause the parts supported by the sleeve member 114 to rotate with the sleeve or nut member 102 when the servomechanism is in inoperative position.

A similar frictional engagement between the sleeve member 114 and the sleeve or nut member 102 may be obtained as indicated in Fig. 8, in which a sleeve member 114' of the same general construction as that previously described in connection with the sleeve 114 is shown without the finger 139 but instead is slightly egg-shaped in section. Because of the fact that the sleeve 114' is formed from relatively light gauge material, it may be readily forced onto the sleeve or nut 102, and will resiliently contract thereon which, in turn, will cause it to be frictionally urged toward equal rotation with the sleeve or nut member 102.

Axial movement of the sleeve 130 together with the plate 136 may be controlled through a clutch pedal 140 in the same manner as a conventional clutch is controlled. In other words, the pedal 140 is pivotally mounted as at 142 either on the clutch housing 14 or upon the frame of the vehicle and is connected by a link 144 and arm 146 with a shaft 148 extending transversely through the housing 14. Within the housing 14 the shaft 148 has secured thereto the usual clutch throw-out yoke 150, the free ends of the arms of which engage abutments 152 formed on diametrically opposite sides of the sleeve 130. Accordingly, when the clutch pedal 140 is depressed, the free ends of the clutch throw-out yoke 150 are moved forwardly and through the abutments 152 urge the sleeve 130 and plate 136 forwardly so as to bring the plate 136 into frictional engagement with the ring 138 secured to the disc 118. The throw-out yoke 150 is normally urged toward inoperative position by spring or other means, the particular means shown by way of illustration including a coil spring 154 which, as indicated in Fig. 1, is maintained under tension between an extension on the pedal 140 below its point of pivot and some suitably fixed point such as the power plant. It may also be noted that the outer sleeve or nut member 102 with the parts mounted thereon, is returned from clutch disengaged toward clutch engaged position by the pressure of the springs 38 acting through the inner ends of the clutch fingers 76.

It will be understood that when the clutch structure above described is in engaged position and rotating, the sleeve members 100 and 102 together with the disc 118 rotate equally with the flywheel 22 which, of course, is the clutch driving member. The disc 122 will rotate with the sleeve 102 when the clutch is engaged but will rotate equally with the sleeve 104 when the clutch is disengaged, it being provided, together with the ball bearings 124, to serve as a thrust bearing between the disc 118 and the inner ends of the clutch fingers 76 so as to enable pressure to be applied thereto without any rubbing action between the fingers 76 and the disc 118.

The operation of the above device, assuming the parts to be in the relative positions indicated in Figs. 1 and 2, and rotating, is as follows:— When the pedal 140 is depressed against the force of the spring 154, the collar 130 with its plate 136 will move forwardly, or to the left as viewed in the drawings, until its forward face contacts with the ring 138 secured to the disc 118. When this occurs, the frictional engagement between the plate 136 and the disc 138 will tend to retard rotation of the disc 118. If the disc 118 is fixed to the sleeve 114, as in the preferred form of construction as outlined above, the sleeve 114 will also be equally retarded in its rotation and, because it is frictionally engaged with the sleeve or nut member 102, as through the spring finger 139, the rotation of the sleeve or nut member 102 will be retarded, causing it to rotate relative to the sleeve 100 and therefore cause it to move forwardly to bring the plate 122 into contact with the inner ends of the fingers 76. If the disc member 118, instead of being fixed to the sleeve member 114 as is preferred, is frictionally associated therewith as has been previously suggested, then under such conditions, because the disc 118 is frictionally urged toward equal rotation with the sleeve member 114 and the latter in turn is frictionally engaged with the sleeve or nut member 102, rotation of the sleeve member 102 with respect to the sleeve member 100 will be retarded. Accordingly, as soon as relative retardation of the rotation of the sleeve member 102 with respect to the sleeve member 100 is effected, because of the thread-like engagement between the sleeves 100 and 102, the sleeve member 102 will be caused to move forwardly so as to urge the disc or plate 122 against the inner ends of the clutch fingers 76. In either case, that is, whether the disc is fixed to or frictionally associated with the sleeve 114, if the depressing movement of the pedal 140 continues so as to cause the plate 136 to follow up the forward displacement of the ring 138 and disc 118 together with the sleeves 114 and 102, the sleeve member 102 will be caused to continue its forward movement until the clutch fingers 76 have moved toward or to the position indicated in Fig. 3, at which time the pressure plate 36 has been withdrawn from engagement with the driven disc 30 and thus placed the clutch in disengaged position wherein the driving and driven elements of the clutch are free to rotate independently of each other.

It is to be particularly noted that in case the disc 118 is frictionally associated with the sleeve 114 instead of being fixed thereto as preferred, under such circumstances as the sleeve member 102 thus moves forwardly toward clutch disengaged position, the pressure required to move the clutch fingers 76 will be transmitted through the plate 122, balls 124, disc 118 and spacer member 116 to the flange 120 on the sleeve member 114 and thence through this flange to the forward face of the flange 112 on the rear end of the sleeve 102. Accordingly this force will tend to clamp all of these members together axially and to frictionally lock the disc 118 to the spacer member 116 when the latter is free to turn with respect thereto, the spacer member 116 to the flange 120 when the former is free to rotate relative thereto, and the flange 120 to the flange 112, and the greater the force which is transmitted the greater will be the frictional engagement between these parts. The same general effect will be realized where the disc 118 is fixed to the sleeve 114, for in such case the pressure required to move the clutch fingers 76 will cause the sleeve 114 to be pressed against the flange 112 with a corresponding force tending to frictionally lock these parts together for equal rotation. The plate member 122 being separated from disc 118 by the balls 124 will of course be free to rotate relative to the disc 118 regardless of the amount of this pressure. Accordingly it will be noted that whether the disc 118, spacer 116 and sleeve 114 are only lightly frictionally engaged with each other, or are fixed to each other, and the sleeve 114 only lightly frictionally engages the sleeve or nut member 102 in either case, as soon as they are subjected to the force required to disengage the clutch, they are relatively strongly urged frictionally for equal rotation with each other.

A feature of this servomechanism which enables absolute control over the movement of the mechanism which it is actuating in accordance with the position of the control lever, and whether the servomechanism is applied to a clutch, brake or other device, will be apparent from the following explanation in connection with the clutch structure shown. It will be observed that when the clutch pedal 140 is depressed to move the plate 136 forwardly, and the plate 136 is brought into frictional engagement with the ring 138 on the disc 118 so as to cause a relative rotation thereof and the sleeve 102 with respect to the sleeve 100, should the movement of the pedal 140 be stopped at this point the disc 118 will move forward only to such extent as the pressure acting on it through the clutch fingers 76 tending to force it rearwardly balances the frictional drag exerted between the plate 136 and ring 138 multiplied by the mechanical advantage of the thread-like engagement between the sleeves 100 and 102. Because of the large mechanical advantage through the thread-like engagement of the members 100 and 102, the amount of friction usually set up between the plate 136 and ring 138 will be unusually low and not sufficient to set up undue heating of the rubbing surfaces thereof even during continuation of such rubbing contact. Should the clutch pedal 140 now be further depressed, the frictional engagement between the plate 136 and ring 138 will be increased, causing a further relative rotation of the disc 118 and outer sleeve member 102 with respect to the inner sleeve member 100, and the disc 118 and the sleeve member 102 will be caused to move further forwardly until the balanced condition above described will again have become established. In other words, it will be apparent that in order to cause complete disengagement of the main clutch, the pedal 140 must be depressed so as to cause the plate 136 to follow up the advancing movement of the ring 138 and disc 118 as these parts move forwardly against the pressure exerted upon them by the clutch fingers 76, until the clutch has been moved to disengaged position. Likewise and for the same reason, the return movement of the mechanism towards clutch engaged position may be just as accurately and progressively controlled as the movement thereof towards clutch disengaged position. Accordingly, engaging and disengaging movements of the clutch may be controlled just as accurately through the servomechanism herein provided as it could were the servomechanism not provided and these movements of the clutch controlled entirely by directly applied manual pressure as in conventional constructions, the only difference being in this respect that by the use of this servomechanism only a small percentage of the manual effort required to operate the clutch is required as compared to the pressure necessary where the clutch is directly manually actuated.

Should the plate 136 be allowed to return to normal inoperative position at a rate of speed faster than that which the disc 118 and outer sleeve member 102 is capable of equaling, such as may occur where the operator of the clutch is holding the clutch in disengaged position and permits his foot to slip off of the clutch pedal, because of the free rolling engagement between the sleeve members 100 and 102 the rate of rotation of the sleeve member 102 and disc 118, by the time the ring 138 has moved back into contact with the plate 136, will have set up so much inertia in the moving parts, namely, the member 102, disc 118, ring 138, spacer member 116 and sleeve member 114, that were these parts all fixed together and not otherwise designed for overcoming of this inertia in the short time available, damage to the parts involved might occur. This of course is more or less an abnormal condition, but it is deemed best to guard against it, and the particular construction of the servomechanism herein provided acts to materially reduce the possible ill effects thereof.

Under such circumstances, and considering now that the outer sleeve member 102 together with the disc 118, ring 138, spacer member 116 and sleeve member 114 are being revolved rapidly under pressure from the clutch fingers 76 in an attempt to equal the return speed of the plate 136 which, as is being considered, has been returned to the position indicated in Figs. 2 and 4 at a rate of speed faster than can be accomplished by the outer sleeve member 102 and parts carried thereon, the disc 118 will in moving rearwardly through such rotation, finally bring the ring member 138 into contact with the plate 136 while rotating at this relatively high speed. As soon as the ring member 118 contacts through the ring 138 with the plate 136, further rearward movement of the disc 118 and other parts supported on the sleeve member 114, together with the sleeve member 114, will be prevented and because of the frictional engagement between the ring 138 and the plate 136 the rotational movement of these parts will be quickly retarded. Because of the frictional engagement between the sleeve 114 and the sleeve or nut member 102, contact between the ring 138 and plate 136 will not jam these parts together under the mechanical advantage of thread-like engagement between the sleeve members 100 and 102 with anything near the force that otherwise would occur were the disc member 118 fixed to the sleeve or nut member 102, and this particularly so by reason of the fact that when the ring 138 thus contacts with the plate 136 the assembly is relieved of the momentum of the sleeve or nut member 102 which may continue to rotate and move rearwardly by simply overcoming the friction between it and the sleeve 114.

Means must of course be provided for limiting further rearward movemnt of the sleeve or nut member 102 under such conditions and although relatively simple means may be provided for this purpose, as for instance the peripherally projecting split spring ring 160, which is sprung into a suitable peripheral recess in the rear end of the sleeve 100 and projects radially outwardly therefrom to a position intersecting the possible path of movement of the rear end of the sleeve 102, particularly in a case like the present where the sleeve 102 has been relieved of the added inertia of the disc 118 under the conditions now assumed, I prefer to provide more suitable means in a manner which will now be described. It is to be noted that if actual engagement between the rear end of the sleeve 102 and the ring 160 was relied upon for limiting rearward axial movement of the sleeve 102, the ring 160 would be required to withstand the inertia of the sleeve 102 at the time of contact multiplied by the mechanical advantage of the thread-like engagement between the sleeves 100 and 102. Obviously, under certain conditions the force thus required to be overcome might reach relatively large values. In order to eliminate the mechanical advantage of the thread-like engagement between the sleeves 100 and 102 from being effective in such case, a forwardly extending lug 162, as best shown in Figs. 2, 3 and 5, is struck out from the split ring 160. A similar lug 164 is struck outwardly from the retainer sleeve 110 for the balls 108, and the rear face of the sleeve 102 including the flange 112 is cut out as at 166 to provide an axially parallel stop surface 168. The lugs 162 and 164 and the stop surface 168 are so located relative to the members on which they are formed that when the sleeve or nut member 102 has rotated to such a great extent as to bring its rear or right-hand into proximity with the stop ring 160, as indicated in Figs. 4 and 5, the stop surface 168 will contact with the lug 164 and the lug 164 in turn will contact with the lug 162. When this occurs it will be apparent that any inertia remaining in the sleeve or nut member 102 because of its rotation and rearward movement will be overcome by direct contact between these stop surfaces and members and without such inertia being multiplied by the mechanical advantage existing in the thread-like engagement between the sleeve members 100 and 102. Accordingly, and particularly in view of the fact that at such time as previously noted the sleeve member 102 will have been relieved of any inertia that might otherwise have accompanied it through the ring 118 and associated parts on the sleeve 114, relatively light and simple means of the character described may be provided for bringing the sleeve or nut member 102 to rest.

It will be readily understood that in case the various parts of the servomechanism have been moved to the positions indicated in Figs. 4 and 5 through some abnormal operation of the clutch as that described, thereby causing a rather severe frictional engagement between the ring 138 and plate 136 at the time the stop members 162 and 164 and the stop surface 168 are brought into engagement with each other, sufficient relative rotation will immediately be caused between the sleeve members 100 and 102 to move the disc 118 and ring 138 forwardly to such an extent as to relieve the frictional engagement between the ring 138 and plate 136 from exerting sufficient retarding action on the sleeve or nut member 102 to cause further axial movement thereof. However, as soon as the pedal 140 is again depressed to move the main clutch to disengaged position, the resulting operation of the servomechanism will again move the various parts thereof and particularly the sleeve 114 with respect to the sleeve member 102, to the normal positions indicated in Figs. 2 and 3.

From the above it will be apparent that in accordance with the present invention a construction is provided whereby the inertia of certain moving parts of the servomechanism under abnormal conditions of operation is so regulated and absorbed that the possible harmful effects thereof are minimized to such an extent as to be practically negligible and that this is accomplished with a simple, economical and effective apparatus.

In the foregoing description it has been assumed in all cases that the flywheel 22 has been rotating so as to furnish the power necessary to operate the servomechanism to obtain the advantage thereof. The clutch may be released without necessitating rotation of the flywheel, however, as this may be necessary or desirable in some instances. Where the flywheel is not rotating, advancement of the foot pedal 140 will cause the plate 136 to advance as previously described, causing it to contact the disc 118 and urge it forwardly. Because the disc 118 will not be rotating under the condition mentioned, contact of the plate 136 and disc 118 will not act to cause operation of the servomechanism, but instead the disc 118 will move forwardly with the plate 136 and, acting through the balls 124 and disc 122 will move the inner ends of the clutch fingers 76 forwardly a corresponding distance. In thus moving forwardly the disc 118 and disc 122 will carry the sleeve 114 and spacer 116 along with them, the sleeve 114 sliding over the surface of the outer nut member 102. Thus in such case, if the foot pedal 140 is sufficiently depressed, the fingers 76 may be moved a sufficient distance to disengage the clutch, but in such case the operator must supply all the force as the servomechanism will not be operative at such time. When the pressure on the pedal 140 is released under such circumstances, the pressure of the springs 38 acting through the fingers 76 will cause the various parts of the servomechanism to resume their normal operative positions.

Formal changes may be made in the specific embodiment of the invention described without departing from the spirit or substance of the broad invention, the scope of which is commensurate with the appended claims.

I claim:

1. In a servomechanism, in combination, a pair of relatively rotatable and axially movable members, and braking means for one of said members including a pair of frictionally engageable parts, one of which is frictionally associated with one of said members and the other of which is manually controllable in its relation to the first mentioned part.

2. In a servomechanism, in combination, a pair of relatively rotatable and axially movable members, and braking means for one of said members including a pair of frictionally engageable parts, one of which is frictionally associated with one of said members and constantly urged thereby for equal rotation therewith.

3. In a servomechanism, in combination, a pair of relatively rotatable and axially movable members, and braking means for one of said members including a pair of frictionally engageable parts one of which is mounted for slidable movement on one of said members, and means frictionally urging said one of said parts for equal movement with said one of said members.

4. In a servomechanism, in combination, a pair of relatively rotatable members arranged to cause axial movement of one of them upon relative rotation between them, a part rotatably associated with said one of said members, said part being frictionally urged for equal rotation with said one of said members, and means frictionally engageable with said part for retarding rotation thereof.

5. In a servomechanism, in combination, a pair of relatively rotatable members adapted for relative axial displacement upon said relative rotation, a part rotatably and slidably mounted upon one of said members and frictionally urged for equal movement therewith, and means frictionally associable with said part for retarding rotation thereof.

6. In a servomechanism, in combination, a pair of relatively rotatable members adapted for axial displacement upon said relative rotation, a part rotatably and axially slidably associated with one of said members, means frictionally urging said part for equal movement with said one of said members, stop means for limiting axial movement of said part in one direction relative to said one of said members, and means selectively engageable with said part for retarding rotation thereof.

7. In a servomechanism, in combination, a pair of relatively rotatable members adapted for axial displacement upon said relative rotation, a sleeve axially movable and rotatable relative to one of said members frictionally urged for equal movement therewith, a brake including a part mounted on said sleeve for equal movement therewith and a second member frictionally engageable with the first mentioned part.

8. In a servomechanism, in combination, a pair of relatively rotatable members adapted for axial displacement upon said relative rotation, a sleeve axially movable and rotatable relative to one of said members, a spring finger fixed to said sleeve and bearing against said one of said members, a brake including a part mounted on said sleeve for equal axial movement therewith and a second member frictionally engageable with the first mentioned part.

9. In a clutch structure, in combination, a driving member, a driven member, a pressure plate adapted to clamp said driven member to said driving member for equal rotation therewith, spring means constantly urging said pressure plate toward said clamping position, fingers movable to retract said pressure plate from clamping relation with respect to said driven member against the force of said spring means, a sleeve fixed for equal rotation with said driving member, a second sleeve rotatable relative to the first mentioned sleeve and adapted to be moved axially thereof upon relative rotation with respect thereto, means operatively connecting said second sleeve and said fingers including a part frictionally associated with said second sleeve and adapted for relative axial sliding movement with respect thereto, and means for frictionally retarding rotation of said part.

10. In a clutch structure, in combination, a driving member, a driven member, a pressure plate adapted to clamp said driven member to said driving member for equal rotation therewith, spring means constantly urging said pressure plate toward said clamping position, fingers movable to retract said pressure plate from clamping relation with respect to said driven member against the force of said spring means, a sleeve fixed for equal rotation with said driving member, a second sleeve rotatable relative to the first mentioned sleeve and adapted to be moved axially thereof upon relative rotation with respect thereto, an abutment surface on said second sleeve, a part frictionally associated with said second sleeve and adapted for relative rotation and axial sliding movement thereon, means frictionally engageable with said part for retarding rotation thereof, and means associated with said part adapted for interengagement with said fingers, the last mentioned means adapted to transmit the force required to move said fingers through said part to said abutment thereby to frictionally urge said part and said second sleeve for equal rotation under a force proportional to the force exerted upon said fingers.

11. In a servomechanism, in combination, a pair of concentric members one received within the other, said members having opposed thread-like grooves formed in their opposed faces, rolling anti-friction means disposed between said opposed grooves for threadedly connecting said members, a retainer received between said members and being provided with apertures therein for receiving said anti-friction means, an abutment on one of said members disposed in generally perpendicular relationship with respect to the thread-like path of travel of a point thereon, an abutment on the other of said members disposed in approximately perpendicular relation with respect to the relative thread-like path of travel of the first named abutment, and an abutment on said retainer disposed in approximately perpendicular relationship with respect to the relative thread-like path of travel of the two first mentioned abutments.

ROBERT C. RUSSELL.